O. FREYTAG.
ICE MAKING APPARATUS.
APPLICATION FILED FEB. 2, 1911.
1,004,405.
Patented Sept. 26, 1911.
2 SHEETS—SHEET 1.
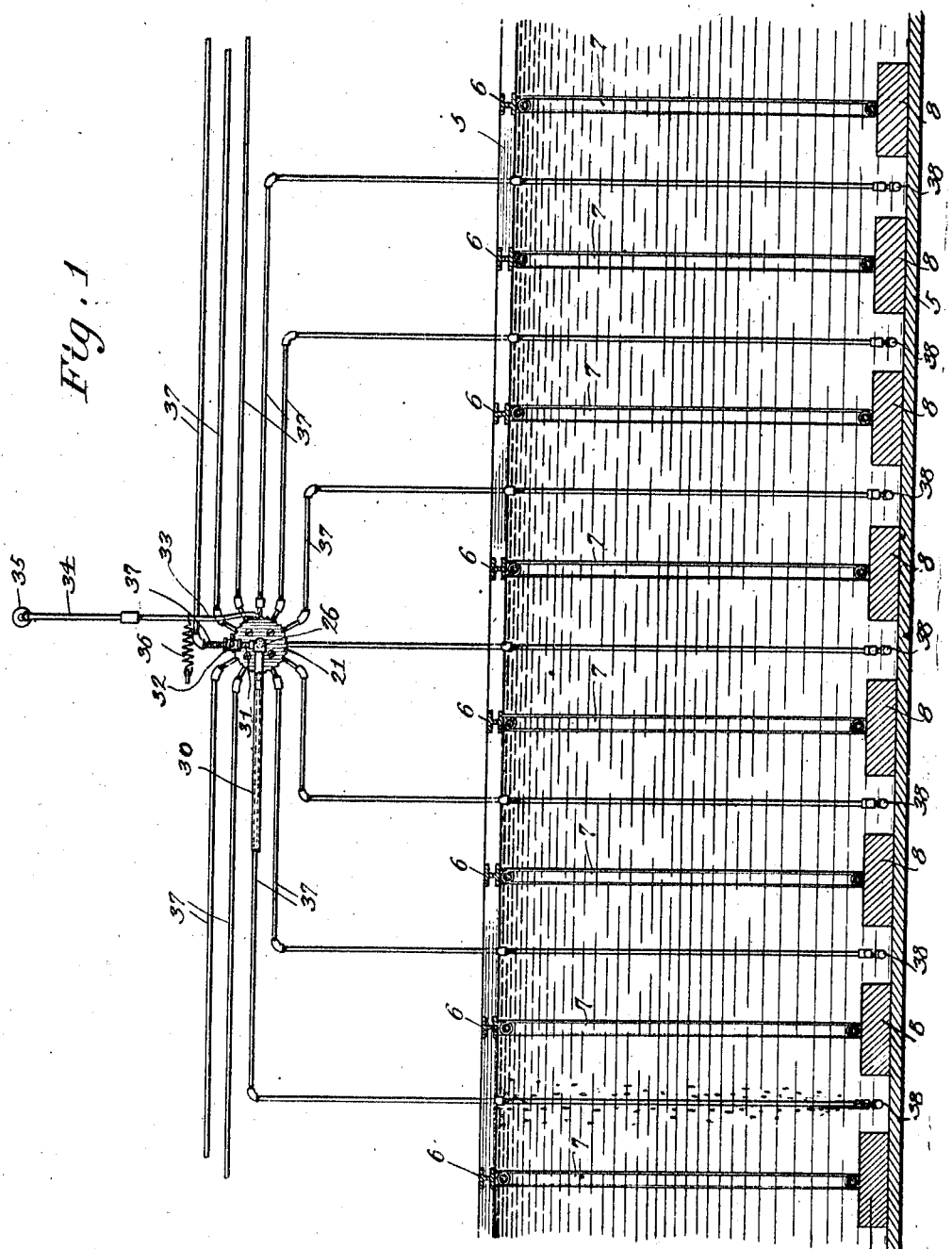
WITNESSES
INVENTOR
Otto Freytag
Attorney.

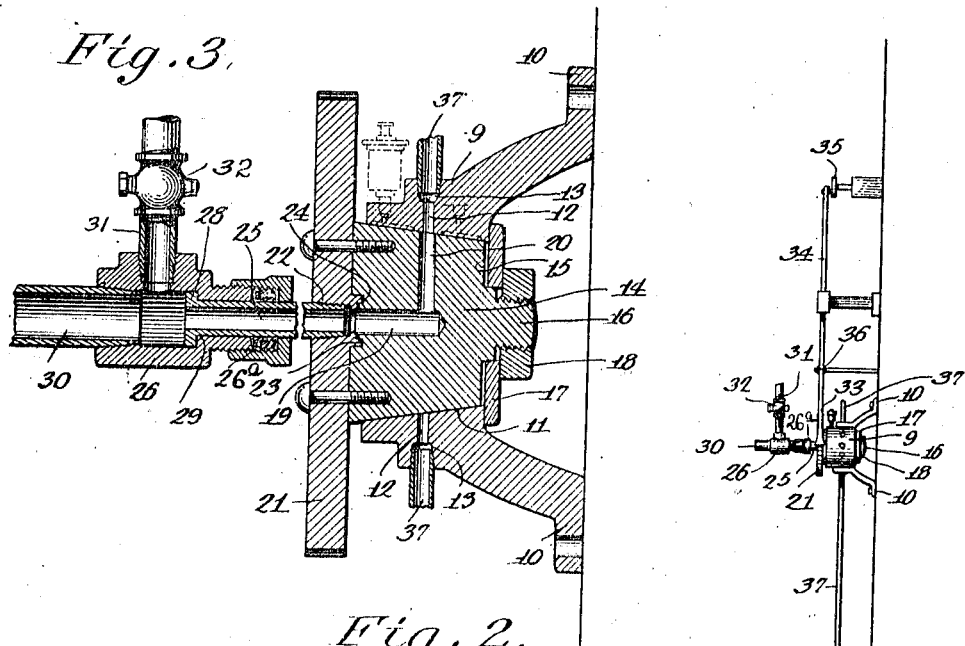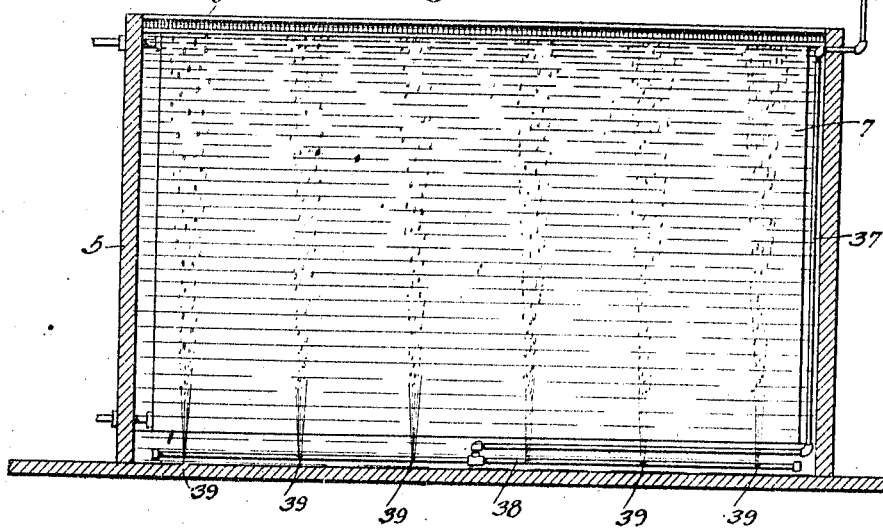

UNITED STATES PATENT OFFICE.

OTTO FREYTAG, OF BOISE, IDAHO.

ICE-MAKING APPARATUS.

1,004,405.  Specification of Letters Patent.  Patented Sept. 26, 1911.

Application filed February 2, 1911. Serial No. 606,170.

*To all whom it may concern:*

Be it known that I, OTTO FREYTAG, a citizen of the United States, residing at Boise, in the county of Ada and State of Idaho, have invented certain new and useful Improvements in Ice-Making Apparatus, of which the following is a specification, reference being had therein to the accompanying drawing.

This invention relates to the subject of making ice, and the principal object of the same is to provide a simple apparatus in which clear, hard ice will be quickly and economically made.

As is well known "raw" water when frozen produces ice that is white or opaque and this is due to the fact that air cells are frozen therein. The present invention aims to overcome this defect by intermittently blowing jets of compressed air through the raw water so that the air cells will be forced to the surface of the water that is to be frozen so that clear, hard ice will be produced.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a vertical sectional view of a freezing tank, showing in elevation, the improved air delivering mechanism. Fig. 2 is a transverse sectional view thereof. Fig. 3 is a vertical sectional view of the air delivering mechanism.

The improved mechanism for automatically and intermittently delivering air to liquid that is to be frozen has been shown in connection with a tank 5 having regularly spaced parallel supporting beams 6 extending transversely across the upper portion thereof above the water level, said beams being preferably I-shaped and having the plates 7 suspended therefrom and resting on the supports 8 carried by the bottom of tank 5 so that the lower ends of said plates are retained above the bottom of said tank. The tank described obviously produces what is termed plate ice, but it is to be understood that this invention is not limited to use in connection therewith.

The air delivery mechanism comprises a bracket 9 having the flattened outturned feet 10 adapted to be fastened to a wall or other support. Said bracket is provided with a cylindrical bearing opening 11 which preferably tapers and from which the ports 12 radiate and extend transversely through the body of the bracket and terminate in enlarged internally threaded outlets 13. A plug 14, shaped to correspond with the contour of the bearing 11, is rotatably fitted in said bearing and has its rear end provided with a seat 15 from which a threaded shank 16 projects. A washer 17 is fitted over said shank 16 and is clamped to the seat 15 and the rear end of the body of the bracket 5 by means of a nut 18 that engages said shank. The plug 14 is provided with a central inlet passage 19 the inner end of which communicates with a lateral discharge passage 20 adapted to be intermittently brought into registry with the ports 12 by the rotations of said plug. The outer end of plug 14 projects beyond bracket 5 and has a ratchet wheel 21 detachably fastened thereon that is provided with an internally threaded central opening 22 that communicates with inlet passage 19. An annular flange 23 surrounds the rear end of opening 22 and is tightly fitted in a groove 24 that surrounds the front end of passage 19 to seal the joint between said opening and passage.

A hollow shaft 25 has one end equipped with threads that engage the threads of opening 22. The other end of said shaft extends into a chamber 26, through a stuffing box 26ª, and is provided with a flange 28 that abuts a shoulder 29 in said chamber. An air supply pipe 30 extends into said chamber 26 and a relief pipe 31 also extends therein, said pipe 31 being provided with a controlling valve 32.

The ratchet wheel 21 is intermittently rotated by means of a pawl 33 that is carried by an operating rod 34. The rod 34 is eccentrically connected to a disk 35 that is rotated by suitable power to reciprocate said rod. A spring 36 is employed to hold the pawl 33 in position to engage the teeth of the ratchet wheel 21.

Pipes 37 extend from the outlets 13 of ports 12 and project into tank 5 between the plates 7 and terminate in branches 38 that extend transversely across the lower portion of the tank between the supports 8 and are provided with discharge outlets 39.

As will be understood from the foregoing, the plug 14 is intermittently rotated by means of the ratchet 21 and pawl 33 so that the passage 20 intermittently aline with ports 12 of bracket 5. The compressed air is delivered to passage 19 by the pipe 30. Therefore it will be clear that as the passage 20 is placed in communication with ports 12, the pipes 37 which are connected to the outlets 13 thereof will convey the air to the branches 38 so that the outlets 39 thereof will discharge jets through the water, as is shown in Fig. 2, so that air cells in said water will be forced to the surface thereof.

What I claim as my invention is:—

1. An apparatus for delivering air jets to freezing receptacles comprising a source of air supply, air jet discharging means, intermittently operated rotatable mechanism controlling the delivery of air from said source of supply to said discharging means, and means for operating said mechanism.

2. In an ice making apparatus, the combination with a water containing tank, of air conveying means extending into said tank and having outlets in the base portion thereof, and intermittently operated rotatable mechanism for controlling the supply of air to said conveying means.

3. In an ice making apparatus, the combination with a freezing receptacle, of air conveying pipes extending therein and provided with discharge outlets, a source of air supply, a rotatable valve controlling the communication between said air supply and said pipes, and means for intermittently rotating said valve.

4. In an ice making apparatus, the combination with an ice making receptacle, of a supporting bracket provided with radiating ports, a plug rotatable in said bracket and provided with passages adapted to be placed in communication with said ports, means for delivering air to said passages, means for intermittently rotating said plug, and air conveying pipes connected to said ports and having discharge branches in said receptacle.

5. An apparatus for delivering air jets to freezing receptacles comprising a supporting bracket provided with radiating ports, a plug rotatable in said bracket and provided with an outlet passage adapted to be placed in communication with said ports and with an inlet passage that communicates with said outlet passage, a ratchet wheel carried by said plug, means engaging said ratchet to intermittently rotate said plug, means extending through said ratchet for delivering air to said inlet passage, and air conveying means extending from said ports and provided with discharge outlets.

6. In an ice-making apparatus, the combination with a freezing receptacle, of pipes extending across the bottom thereof and provided with discharge outlets, a source of air supply, intermittently operated rotatable mechanism controlling the delivery of air to said pipes, and means for operating said mechanism.

In testimony whereof I hereunto affix my signature in presence of two witnesses.

OTTO FREYTAG.

Witnesses:
E. D. CLARK,
G. E. TONKIN.